United States Patent [19]

Volpe, Jr. et al.

[11] Patent Number: 4,978,972

[45] Date of Patent: Dec. 18, 1990

[54] MODULAR THERMAL PRINT HEAD AND METHOD OF FABRICATION

[75] Inventors: Luke R. Volpe, Jr., Melrose; Lowell E. Thomas, Tewksbury, both of Mass.

[73] Assignee: Dynamics Research Corporation, Wilmington, Mass.

[21] Appl. No.: 421,534

[22] Filed: Oct. 13, 1989

[51] Int. Cl.[5] .......................... G01D 15/10; B41J 3/20

[52] U.S. Cl. ................................ 346/76 PH; 346/1.1; 219/216; 400/120

[58] Field of Search ........................... 346/1.1, 76 PH; 219/216 PH; 400/120

[56] References Cited

U.S. PATENT DOCUMENTS

| | | | |
|---|---|---|---|
| 4,399,348 | 8/1983 | Bakewell | 346/76 PH |
| 4,506,272 | 3/1985 | Arai | 400/120 |
| 4,534,814 | 8/1985 | Volpe et al. | 356/76 PH |
| 4,636,811 | 1/1987 | Bakewell | 346/76 PH |
| 4,731,619 | 3/1988 | Miura et al. | 346/76 PH |
| 4,733,254 | 3/1988 | Yukihiro et al. | 346/76 PH |
| 4,746,930 | 5/1988 | Shimazaki et al. | 346/76 PH |
| 4,810,852 | 3/1989 | Bakewell | 346/76 PH |

FOREIGN PATENT DOCUMENTS

| | | | |
|---|---|---|---|
| 0161560 | 7/1987 | Japan | 219/216 PH |

*Primary Examiner*—Bruce A. Reynolds
*Assistant Examiner*—Huan Tran
*Attorney, Agent, or Firm*—Weingarten, Schurgin, Gagnebin & Hayes

[57] ABSTRACT

A modular thermal print head and method of fabricating same including a first member having at least one surface on which is arranged an array of electrodes, and a second member mounted in spaced relationship to the first member and having at least one surface on which is disposed a single conductor element. A thermal printing element having an array of electrically resistive members terminated at one end by conductor pads arranged in an array, and proximate a second end to a common conductive member is provided. The thermal printing element is disposed between the first and second members with its array of conductor pads in contact with the array of electrodes on the first member, and its common conductive member in contact with the single conductor element on the second member. Selected portions of the thermal printing element may be energized to produce thermal printing energy.

20 Claims, 4 Drawing Sheets

MODULAR THERMAL PRINT HEAD AND METHOD OF FABRICATION

FIELD OF THE INVENTION

This invention relates to print heads used in thermal printing and more particularly, to a modular thermal print head and method of fabricating such a print head.

BACKGROUND OF THE INVENTION

Thermal printing utilizing thermal print heads to produce alpha-numeric or other characters on thermally sensitive paper drawn across the print head surface is well known. The characters are formed by selectively energizing one or more resistors spaced across a printing element which comes into contact with the thermally sensitive paper. When the resistors are energized, the electrical current causes them to radiate thermal energy which marks the thermally sensitive paper adjacent the resistor. By controlling which resistor is energized at any given moment, patterns of dots are formed on the thermally sensitive paper which produces the desired characters.

Several attempts have been made to manufacture a low cost and reliable thermal print head. Due to the heat generated by the printing element resistors, the print head must be properly designed to control the thermal energy that is generated. In addition, since the heat sensitive paper is advanced across the surface of the print head and resistors, the print head must be replaceable without great expense, once the resistors and print head wear out.

Attempts at manufacturing such a print head include laminating a number of individual elements into a single unitary print head. However, since the printing element containing the resistors is not easily testable without being assembled into the finished print head, new print heads containing defective printing elements must be discarded since the printing element cannot be repaired once laminated into the print head.

Additionally, there is a consideration that the printing element containing the resistors may be a precision, high resolution print head necessitating special manufacturing and assembly techniques while adjacent support and circuit members could be manufactured with considerably different processing techniques or reduced special handling.

SUMMARY OF THE INVENTION

This invention features a modular thermal print head and a method of fabricating such a print head. The modular thermal print head according to this invention comprises three major components including first and second members mounted in fixed spaced relationship to one another. Disposed between and in contact with the first and second members is a printing element which includes an array of spaced, electrically resistive elements. The printing element is adapted to contact thermally sensitive paper as the thermally sensitive paper is advanced past the printing element.

The first member may be a printed circuit board manufactured by traditional circuit board techniques and may be made of material such as glass, ceramic, ceramic coated metals or any other non-porous, dielectric material. Along one edge of the first member is located an array of spaced electrodes. The spacing of the electrodes is arranged to correspond to the spacing of the resistor array on the printing element. Typically, the printing element may contain two hundred resistors per inch. On another edge of the first member is disposed an array of input/output pads. The input/output pads are designed to interface the thermal print head with thermal printer control circuitry located within the printer. Additionally, the central area of the first member may include locations on which may be mounted driver circuitry to selectively energize various individual resistor elements from among the resistor array under control of the printer's control circuitry.

The second member is also typically a printed circuit board as previously described. The second member, however, generally includes a single conductor element on at least a portion of one surface of the member. The single conductor element serves as the common plane or power return for the array of resistor elements located on the printing element. The single conductor element extends the full length of the second member along one edge which will contact a common return conductor located on the printing element. This common electrode could be segmented for multiplexing purposes. The second member also includes an input/output pad to interface the thermal print head with the thermal printer control circuitry. In addition, a spacer block, made of materials similar to the first and second members, is laminated between the first and second members to align the members and maintain them in spaced relationship to one another. The spacer block is typically of the same thickness as the cross section of the printing element and has relieved areas to accommodate driver circuitry.

This invention also features a separate printing element which is aligned and disposed in contact with the first and second members. Typically, such a printing element consists of a cylindrical rod of $\frac{1}{8}$ to $\frac{1}{2}$ inches in diameter. The rod may consist of a solid, homogeneous ceramic material coated with a glaze on at least a portion of the surface of the rod to control and optimize thermal characteristics. Such a glaze may include glass or glass/ceramic to give a controlled amount of thermal impedance.

Alternatively, the printing element may comprise a laminated structure typically including two halves laminated to a central core. The central core serves to control thermal characteristics of the printing element. In addition, the core may serve as the power return for the array of resistor elements.

Disposed on one side and along the length of the printing element is an array of resistor elements. The resistor elements may be disposed directly onto the cylindrical rod or alternatively, on top of the glaze. Each resistor element includes a first end which is attached to a conductor pad. The conductor pads are made from a highly conductive and solderable material such as nickel, copper or gold. The conductor pads are arranged in an array along one side of the printing element. Each resistor element is joined proximate its second end to a common conductive member also made from a highly conductive and solderable material.

In order to assemble the thermal print head according to this invention, the printing element is disposed between, and in contact with the first and second members. More particularly, the printing element is positioned such that the array of spaced conductor pads coupled to the resistor array on the printing element, is precisely aligned in contact with the array of spaced electrodes on the first member. Similarly, the printing element is also aligned such that the resistor common conductive member is in contact with the single conductor element or power return on the second member. The print element is then soldered to the first and second members using traditional processes such as vapor phase reflow or localized heat soldering.

An advantage of this invention is the low cost and ease of manufacturing such a thermal print head. Each component may be manufactured utilizing the particular technology or technique necessary to achieve the highest yield and most cost effective results. Accordingly, the printing element can be made according to high precision standards and utilizing such materials or techniques to properly control and manage its thermal characteristics, whereas the adjacent members may be manufactured utilizing conventional, low cost and high yield printed circuit board technology. Specific manufacturing techniques are therefore limited only to the component or components which must be fabricated by such techniques. In addition, the first and second members may be tested before final assembly into the print head.

An additional advantage of this invention is the replaceability of the printing element. Since the printing element is not permanently laminated or formed as an integral member of the thermal print head, the printing element may be replaced if initially defective or upon later becoming unusable.

DESCRIPTION OF THE DRAWINGS

The present invention will be more fully understood by referring to the following detailed description in conjunction with the accompanying drawings, in which.

DETAILED DESCRIPTION OF THE INVENTION

Figure 1A:
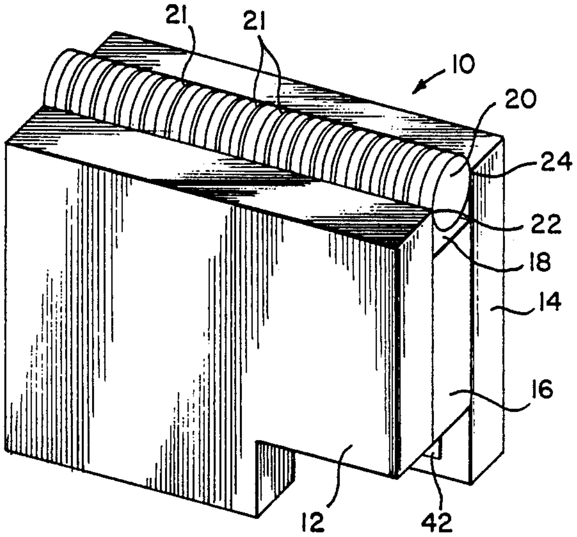
FIG. 1A is a perspective view of the modular thermal print head according to the present invention.
Figure 1B:
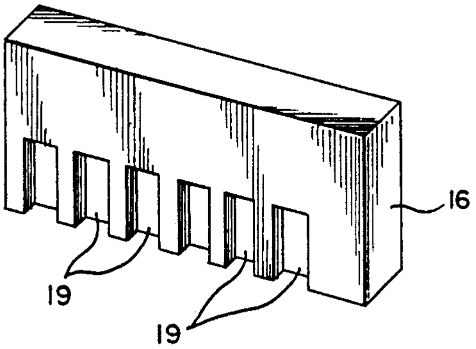
FIG. 1B is a perspective view of the space block with driver circuitry recesses of FIG. 1A.
Figure 1C:
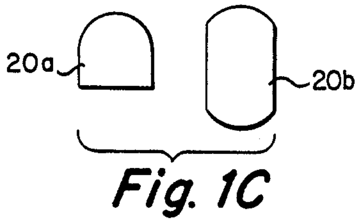
FIG. 1C is a cross section of alternative shapes of the printing element of FIG. 1A.

The modular thermal print head 10, FIG. 1A, according to the present invention includes first member 12 which is mounted in spaced relationship to second member 14 by means of spacer block 16. Spacer block 16 shown in greater detail in FIG. 1B includes recesses 19 which provide clearance for driver circuitry mounted on the first or second members. Spacer block 16 forms space 18 between first and second members 12 and 14. In an alternative embodiment, space 18 can be utilized as a cooling plenum or filled with a heat conducting material such as epoxy. Space 18 is equal in width to the cross section of printing element 20. Printing element 20 includes a plurality of electrically resistive elements such as elements 21 arranged in a spaced array along the surface of printing element 20. Resistor elements 21 contact thermally sensitive paper advanced past the printing element. When selectively energized, resistor elements 21 mark the thermally sensitive paper producing alpha-numeric or other characters on the paper. Printing element 20 is shown in the shape of a cylindrical rod disposed between and in contact with first and second members 12 and 14 along edges 22 and 24 respectively. Alternatively, the printing element may include other shapes as shown by cross sections 20*a* and 20*b*, FIG. 1C.

Figure 2:
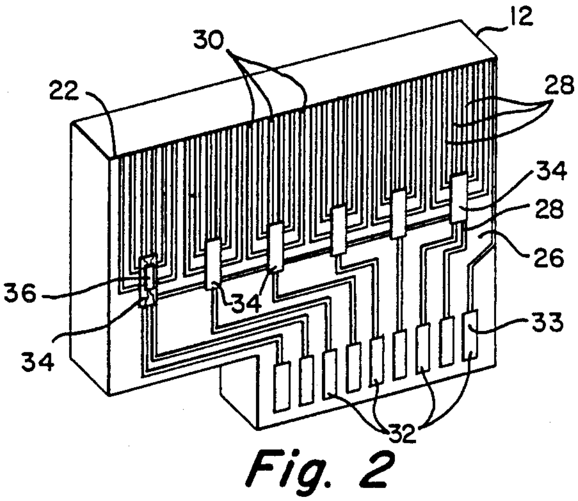
FIG. 2 is a perspective view of the first member showing an array of electrodes, input/output pads and drive circuitry locations.

First member 12, FIG. 2, is shown in greater detail and includes at least one surface 26, on which is located conductive tracks or circuitry 28. Conductive circuitry 28 is arranged along edge 22 to form an array of electrodes 30. The spacing of electrodes 30 is arranged to correspond to the spacing of the conductor pads which terminate one end of each of the resistors on the printing element. Also included on first member 12 are a plurality of input/output pads 32 which are adapted to interface the modular thermal print head with thermal printer energizing and control circuitry, located within a printer and not forming a part of this invention. In addition, locations 34 are provided on which may be attached printing element enabling circuitry such as integrated circuit 36. Enabling circuitry such as integrated circuit 36 coupled to thermal printer energizing and control circuitry by input/output pads 32, operates under control of the thermal printer control circuitry to selectively energize individual resistor elements on the print head to form the desired alpha-numeric or other characters on thermally sensitive paper advanced past the print head.

Figure 3:
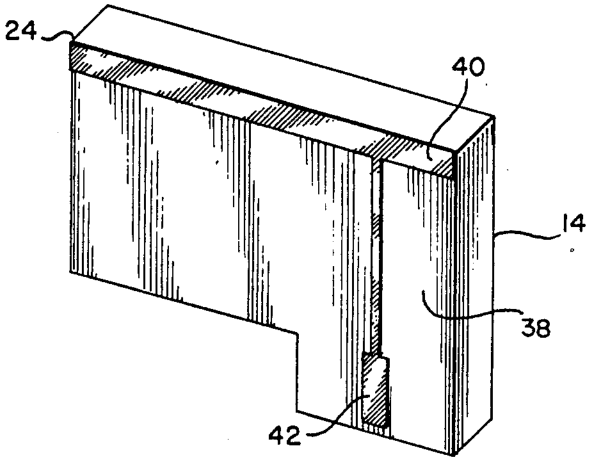
FIG. 3 is a perspective view of the second member showing a single conductor element and input/output pad.

Second member 14, FIG. 3, includes at least one surface 38, on which is disposed single conductor element 40. Conductor element 40 also includes input/output pad 42 which also interfaces with the thermal printer control circuitry. Single conductor element 40 is disposed along edge 24 of second member 14 and adapted to contact a common conductive member on the print head.

Figure 4A:
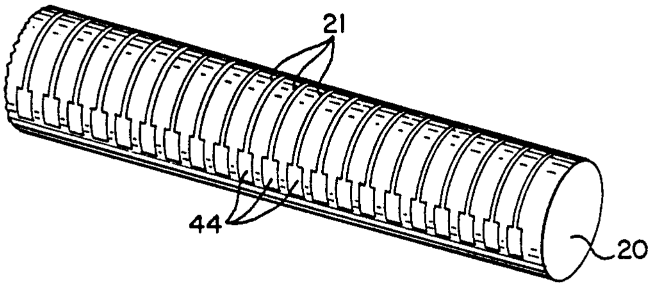
FIG. 4A is a schematic representation of one side of the printing element of this invention.
Figure 4B:
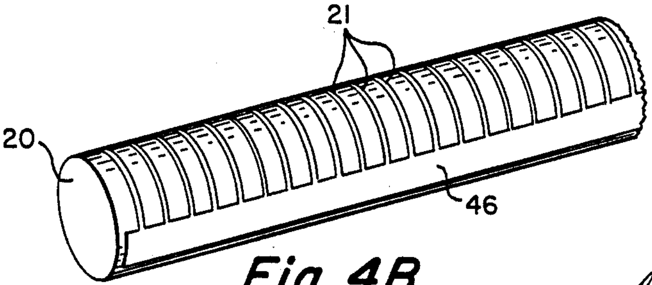
FIG. 4B is a schematic representation of the opposite side of the printing element of FIG. 4A.

Printing element 20, FIG. 4A, includes electrically resistive elements 21 each of which are terminated proximate one end with highly conductive and solderable conductor pads 44. Conductor pads 44 are arranged in an array along one side of printing element 20 and are spaced to align with electrodes 30, FIG. 2, on first member 12. Resistor elements 21, FIG. 4B, are terminated proximate their second end to a common conductive member 46 proximate the other side of printing element 20. Common conductive member 46 is positioned so as to align with single conductor element 40 on second member 14. Common conductive member 46 and single conductor element 40 serve as the common electrode or power return for resistive elements 21.

Figure 4C:
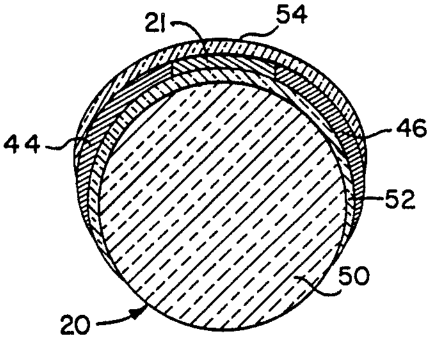
FIG. 4C is a cross-sectional view of the printing element of FIGS. 4A and 4B.

Shown in cross-section in FIG. 4C, printing element 20 is comprised of a cylindrically shaped core 50 made of a homogeneous solid material such as alumina. Disposed on at least a portion of core 50 may be a glaze or coating layer 52. Such a glaze may be made from glass or a glass/ceramic composition. Disposed on top of glaze 52 are resistive elements 21. Resistive elements 21 are terminated and electrically connected at one end by conductor pad 44, and similarly terminated proximate a second end by common conductive member 46. In addition, resistive elements 21 may be coated with a protective or passivation layer 54. Typically, passivation layer 54 is made from ceramic-like material which is thermally conductive, electrically insulative and provides a wear resistant layer.

Figure 5A:
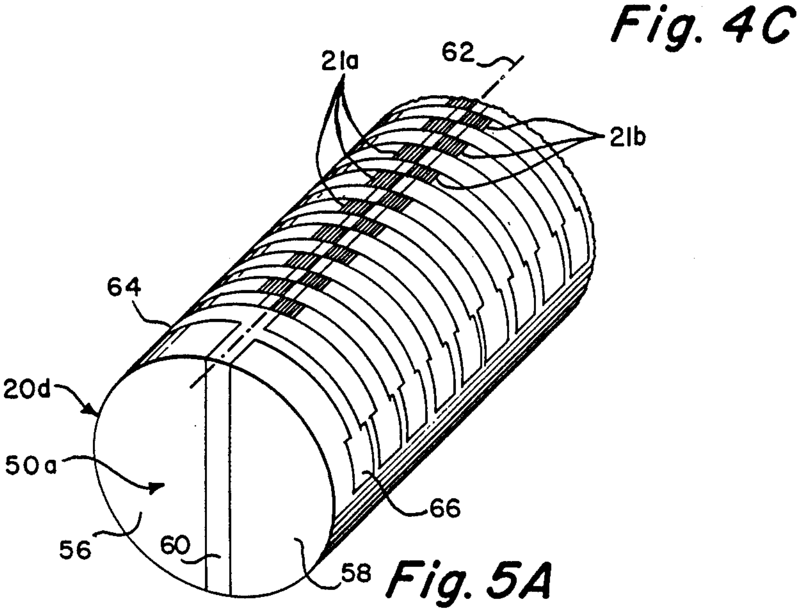
FIG. 5A is a schematic representation of an alternative embodiment of the printing element of this invention showing a laminated printing element with a central electrically conductive core.

In an alternative embodiment, printing element 20*d*, FIG. 5A, may comprise laminated core 50*a* including first and second core halves 56 and 58 laminated to central core 60.

To allow for offset, double row thermal printing, printing element 20*d* may include two arrays of resistive elements. One such array formed by resistor elements 21*a* located on one side of center line 62, and a second array formed by a plurality of resistive elements such as resistive elements 21*b* located on the opposite side of center line 62. Resistive elements 21*a* and 21*b* are not aligned end to end, but are offset along the longitudinal axis of printing element 20*d*. Each of resistive elements 21*a* and 21*b* are electrically connected to center core 60 which serves as a common electrode or power return for energizing the resistive elements. Additionally, contact pads 64 and 66 electrically contact electrodes located along the edge of the first and second members and interfaces with the printer by means such as conductor pad 33, FIG. 2. It is understood that in this embodiment utilizing a double row, offset printing element, second member 14, FIG. 3, would be provided with an array of electrodes and input/output pads as shown in FIG. 2. In addition, drive circuitry may similarly be provided as required.

Figure 5B:
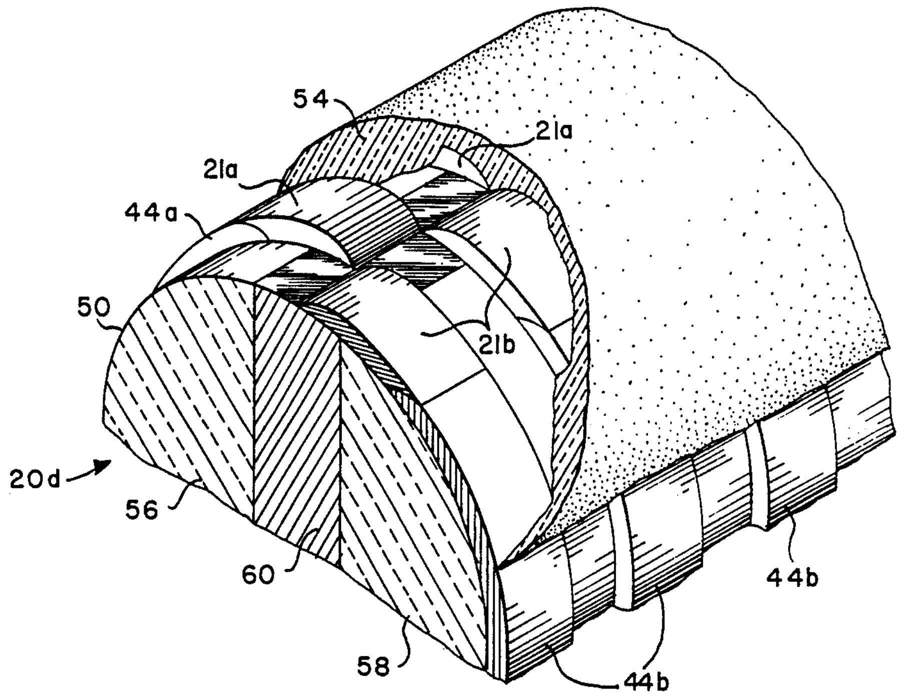
FIG. 5B is an exploded cross-sectional view of the laminated printing element of FIG. 5A.

Laminated printing element 20*d*, FIG. 5B, shown in greater detail includes central core 50*a* comprising first and second halves 56 and 58 respectively. The core halves are separated by central conductive core 60. Resistive elements 21*a* and 21*b* are disposed on the surface of central core 50 and are offset from one another. Resistive elements 21*a* and 21*b* are electrically connected to central conductive core 60. The resistive elements are also electrically connected to conductive members 44*a* and 44*b* which are in turn coupled to energizing means which enable the resistive elements to be selectively energized to effectuate thermal printing. Passivation layer 54 may be provided to protect resistive elements 21*a* and 21*b* against abrasion and wear from contact with thermal paper being drawn across the print head.

Other embodiments will occur to those skilled in the art and are within the following claims.

What is claimed is:

1. A modular thermal print head comprising:

a first member including at least one surface on which is disposed an array of spaced electrodes;

a second member, mounted in spaced relationship to said first member, and including at least one surface having a single conductor element disposed on at least a portion of said surface;

thermal print means, disposed between said first and second members, in contact with said array of spaced electrodes on said first member and said single conductor element on said second member, for conducting electrical current and producing thermal printing energy; and spacer means for mounting said first and second members in non-contacting, spaced relationship to one another, said spacer means being located intermediate to said first and second members and having integral recesses for mounting circuitry related to said thermal print means.

2. The print head of claim 1 in which said thermal print means includes a printing element on which is disposed an array of spaced, electrically resistive members, each of said resistive members terminated proximate a first end with a conductor pad, said conductor pads arranged in an array in contact with said array of spaced electrodes on said first member, and terminated proximate a second end to a common conductive member in contact with said single conductor element on said second member, said resistive members conducting electrical current to produce thermal print energy.

3. The print head of claim 2 further including print head enabling means, coupled to said array of spaced electrodes and print head energizing means, for selectively energizing individual resistive members on said printing element said enabling means being located in said integral recesses.

4. The print head of claim 3 in which said first and second members further include input/output conductor means, for coupling said print head energizing means to said array of resistive members, for selectively energizing individual resistive members.

5. The print head of claim 3 in which said print head enabling means includes a plurality of integrated circuits.

6. The print head of claim 2 in which said printing element comprises a rod having at least one curvilinear shaped portion.

7. The print head of claim 6 in which said array of resistive members are disposed on the at least one curvilinear portion of said rod.

8. The print head of claim 7 in which said resistive member includes a protective coating.

9. The print head of claim 6 in which said printing element is constructed of a homogeneous material.

10. The print head of claim 6 in which said printing element is a laminated structure.

11. The print head of claim 2 in which said second member further includes an array of spaced electrodes in contact with a second array of spaced conductor pads on said printing element.

12. The print head of claim 11 in which said printing element comprises a laminated rod having at least one curvilinear shaped portion and including a common conductive member coupled to each resistive member, and disposed within a central portion of said rod.

13. A modular thermal print head comprising:

a first member including at least one surface on which is disposed an array of spaced electrodes;

a second member, mounted in spaced relationship to said first member, and including at least one surface having a single conductor element disposed on at least a portion of said surface;

thermal print means, disposed between said first and second members, and including a printing element comprising a rod having at least one curvilinear portion on which is disposed an array of spaced electrically resistive members, each of said resistive members terminated proximate a first end with a conductor pad, said conductor pads arranged in an array in contact with said array of spaced electrodes on said first member, and terminated proximate a second end to a common conductive member in contact with said single conductor element on said second member;

spacer means, laminated intermediate to said first and second members, for mounting said first and second members in non-contacting, spaced relationship to one another, said spacer means having a plurality of integral recesses; and print head enabling means including a plurality of integrated circuits disposed in said integral recesses and coupled to said array of spaced electrodes for selectively energizing corresponding resistive members to produce thermal print energy.

14. A modular laminated high resolution thermal print head comprising:

a first member including at least one surface on which is disposed an array of spaced electrodes;

a second member, mounted in spaced relationship to said first member, and including at least one surface having a single conductor element disposed on at least a portion of said surface and an array of spaced electrodes;

thermal print means, disposed between said first and second members, and including a printing element comprising a laminated rod having at least two layers, and including at least one curvilinear portion on which is disposed first and second arrays of spaced, electrically resistive members, each of said resistive members terminated proximate a first end with a conductor pad, said conductor pads arranged in first and second arrays, said first conductor array in contact with said array of spaced electrodes on said first member, and said second conductor array in contact with said array of spaced electrodes on said second member, said first and second resistor array terminated proximate a second end to a common conductive member, integral to said laminated rod, in contact with said single conductor element on said second member; and print head enabling means including a plurality of integrated circuits coupled to said first and second array of resistive members for energizing selected resistive members to produce thermal print energy.

15. The modular thermal print head of claim 16 further comprising spacer means laminated intermediate to said first and second members for mounting said first and second members in non-contacting spaced relationship to one another, said spacer means having a plurality of integral recesses for mounting said plurality of integrated circuits therein.

16. A method of fabricating a modular thermal print head comprising the steps of:

forming first and second print head members;

providing an electrically conductive pattern on at least one surface of said first member, including an array of spaced electrodes proximate a first edge of said first member, and an array of input/output pads proximate a second edge;

forming a single conductor element on at least one surface of said second member;

forming a thermal print member by disposing on the surface of a printing element, at least one array of spaced, electrically resistive members, each of said resistive members terminated proximate a first end with a conductor pad, said conductor pads forming at least one array of conductor pads, said resistive members terminated proximate a second end to a common conductive member;

aligning said first and second members in fixed spaced relationship to one another;

laminating said first and second members to a spacer means located intermediate thereto, said spacer means having a plurality of integral recesses and a plurality of driver circuits mounted in said integral recesses;

positioning said thermal print member between said first and second members such that said array of spaced conductor pads on said printing element contacts said array of spaced electrodes on said first member, and said common conductive member on said printing element contacts said single conductor element on said second member; and joining said thermal member to said first and second members.

17. The method of claim 16 in which joining said thermal print member to said first and second members includes soldering said array of spaced electrodes to said array of spaced conductor pads, and said common conductive member to said single conductor element.

18. The method of claim 16 in which said first and second members are formed of non-porous dielectric material.

19. The method of claim 18 in which said non-porous dielectric material includes glass, ceramic or ceramic coated metal.

20. The method of claim 16 further including forming a second array of spaced resistor members on said printing element terminated proximate one end to a second array of spaced conductor pads; and forming an array of spaced electrodes on said second member to contact said second array of spaced conductor pads on said printing element.

* * * * *

UNITED STATES PATENT AND TRADEMARK OFFICE
CERTIFICATE OF CORRECTION

PATENT NO. : 4,978,972

DATED : December 18, 1990

INVENTOR(S) : Luke R. Volpe and Lowell E. Thomas

It is certified that error appears in the above-identified patent and that said Letters Patent is hereby corrected as shown below:

Column 7, line 43, "15. The modular thermal print head of claim 16" should read --15. The modular thermal print head of claim 14--.

Column 8, line 31, "joining said thermal member to" should read --joining said thermal print member to--.

Signed and Sealed this

Twentieth Day of April, 1993

Attest:

MICHAEL K. KIRK

*Attesting Officer*

*Acting Commissioner of Patents and Trademarks*